(12) United States Patent
Pamplin

(10) Patent No.: US 11,531,403 B2
(45) Date of Patent: Dec. 20, 2022

(54) ONE BUTTON INTERFACE OF A BLENDER

(71) Applicant: BlendJet Inc., Benicia, CA (US)

(72) Inventor: Ryan Michael Pamplin, San Juan, PR (US)

(73) Assignee: BlendJet Inc., Benicia, CA (US)

( * ) Notice: Subject to any disclaimer, the term of this patent is extended or adjusted under 35 U.S.C. 154(b) by 157 days.

(21) Appl. No.: 16/948,933

(22) Filed: Oct. 6, 2020

(65) Prior Publication Data

US 2022/0107691 A1 Apr. 7, 2022

(51) Int. Cl.
*G06F 3/02* (2006.01)
*A47J 43/046* (2006.01)
*A47J 43/07* (2006.01)

(52) U.S. Cl.
CPC .............. *G06F 3/02* (2013.01); *A47J 43/046* (2013.01); *A47J 43/0716* (2013.01)

(58) Field of Classification Search
CPC ........ G06F 3/02; A47J 43/046; A47J 43/0716
See application file for complete search history.

(56) References Cited

U.S. PATENT DOCUMENTS

| | | | |
|---|---|---|---|
| 903,927 | A | 11/1908 | Wendler |
| D123,477 | S | 11/1940 | Fetman et al. |
| 3,931,494 | A | 1/1976 | Fisher |
| 4,095,090 | A | 6/1978 | Pianezza |
| D260,350 | S | 8/1981 | Kahlcke |
| 4,435,084 | A | 3/1984 | Calhoun |
| D274,792 | S | 7/1984 | Price |
| 4,487,509 | A | 12/1984 | Boyce |
| 4,629,131 | A | 12/1986 | Podell |
| 4,741,482 | A | 5/1988 | Coggiola |
| 4,930,709 | A | 6/1990 | Steffens |
| D315,475 | S | 3/1991 | Finger |
| D343,987 | S | 2/1994 | Rotte |
| D349,650 | S | 8/1994 | Lonczak |
| 5,425,579 | A | 6/1995 | Sampson |
| 5,639,161 | A | 6/1997 | Sirianni |
| 5,720,552 | A | 2/1998 | Schindlegger |

(Continued)

FOREIGN PATENT DOCUMENTS

| | | |
|---|---|---|
| CN | 201398891 | 2/2010 |
| CN | 101258964 B | 7/2011 |

(Continued)

OTHER PUBLICATIONS

Youtube.com, BlendJet, Jen Seller's BlendJet Green Smoothie Recipe, Mar. 25, 2019, [site visited Nov. 4, 2021], Available on theInternet URL https://www.youtube.com/shorts/NIFC2ek3Qms (Year: 2019).

(Continued)

*Primary Examiner* — Omar Flores Sanchez
(74) *Attorney, Agent, or Firm* — Esplin & Associates, PC

(57) ABSTRACT

A blender using different modes of operation is disclosed. Exemplary implementations may include a base assembly, a container assembly, a blending component, a control interface, control circuitry, and/or other components. The control interface includes a button configured to be pushed by the user, which controls transitions between the different blending modes of operation and a ready-to-blend mode. Rotation of the blending component is controlled through the control circuitry.

18 Claims, 6 Drawing Sheets

(56) References Cited

U.S. PATENT DOCUMENTS

| | | |
|---|---|---|
| 5,908,037 A | 6/1999 | Pierson |
| 5,911,504 A | 6/1999 | Schindlegger, Jr. |
| D417,815 S | 12/1999 | Endres |
| D448,236 S | 9/2001 | Murray |
| 6,331,070 B1 | 12/2001 | Desai |
| D471,455 S | 3/2003 | Laveault |
| 6,532,863 B1 | 3/2003 | Lee |
| 6,568,843 B1 | 5/2003 | Lai |
| 6,614,206 B1 | 9/2003 | Wong |
| 6,796,705 B1 | 9/2004 | Khubani |
| D504,818 S | 5/2005 | Bakic |
| 6,962,432 B2 | 11/2005 | Hofeldt |
| D518,994 S | 4/2006 | Lin |
| D522,318 S | 6/2006 | McGuyer |
| D536,975 S | 2/2007 | Smith |
| D548,523 S | 8/2007 | Greenspon |
| D550,506 S | 9/2007 | Spitzer |
| D560,445 S | 1/2008 | Tardif |
| 7,314,307 B2 | 1/2008 | Cai |
| 7,364,348 B1 | 4/2008 | Jones |
| 7,384,182 B2 | 6/2008 | Bhavnani |
| 7,422,362 B2 | 9/2008 | Sands |
| D580,702 S | 11/2008 | Holcomb |
| D587,136 S | 2/2009 | Friebe |
| 7,518,343 B2 | 4/2009 | Veselic |
| D603,215 S | 11/2009 | Hollinger |
| D603,704 S | 11/2009 | Jost |
| D604,101 S | 11/2009 | Sands |
| D617,145 S | 6/2010 | Picozza |
| D621,206 S | 8/2010 | Matta |
| D624,359 S | 9/2010 | Schleinzer |
| D634,155 S | 3/2011 | Duncan |
| D635,019 S | 3/2011 | Goto |
| 7,938,574 B2 | 5/2011 | McGill |
| D640,502 S | 6/2011 | Picozza |
| D640,556 S | 6/2011 | Bragg |
| D647,365 S | 10/2011 | Audette |
| 8,056,848 B1 | 11/2011 | Liang |
| D663,202 S | 7/2012 | Biesecker |
| D669,304 S | 10/2012 | Bock |
| D682,030 S | 5/2013 | Ezechukwu |
| D684,817 S | 6/2013 | Leavitt |
| D686,869 S | 7/2013 | Shoshan |
| D690,152 S | 9/2013 | Palermo |
| D700,013 S | 2/2014 | Chu |
| D701,615 S | 3/2014 | Pluska |
| D708,902 S | 7/2014 | Audette |
| D709,325 S | 7/2014 | Guo |
| D716,096 S | 10/2014 | Krooshof |
| 8,851,739 B2 | 10/2014 | Gonzalez |
| 8,950,930 B2 | 2/2015 | Wang |
| D723,872 S | 3/2015 | Kostler |
| D728,302 S | 5/2015 | Vu |
| D729,573 S | 5/2015 | Moon |
| 9,035,222 B2 | 5/2015 | Alexander |
| 9,039,274 B1 | 5/2015 | Corda |
| D731,242 S | 6/2015 | Machovina |
| 9,134,020 B1 | 9/2015 | Wells |
| D742,683 S | 11/2015 | Kim |
| D758,799 S | 6/2016 | Audette |
| D761,056 S | 7/2016 | Kemker |
| D765,462 S | 9/2016 | Davies |
| D765,463 S | 9/2016 | Affatato |
| D770,228 S | 11/2016 | Pan |
| 9,549,639 B2 | 1/2017 | Garr |
| D782,866 S | 4/2017 | Suess |
| D784,071 S | 4/2017 | Davies |
| D784,808 S | 4/2017 | Berroa García |
| D785,402 S | 5/2017 | Shirley |
| D786,614 S | 5/2017 | Smith |
| D789,139 S | 6/2017 | Repac |
| D789,735 S | 6/2017 | Palermo |
| D793,803 S | 8/2017 | Patel |
| D794,385 S | 8/2017 | Lee |
| D799,963 S | 10/2017 | Akiyama |
| D801,109 S | 10/2017 | Lee |
| 9,775,467 B2 | 10/2017 | Sapire |
| 9,787,130 B2 | 10/2017 | Kim |
| 9,801,498 B2 | 10/2017 | Fach |
| 9,814,331 B2 | 11/2017 | Alexander |
| D804,258 S | 12/2017 | Kim |
| 9,839,326 B2 | 12/2017 | Sapire |
| D815,486 S | 4/2018 | Suess |
| D816,394 S | 5/2018 | Yeung |
| D816,994 S | 5/2018 | Fischer |
| D817,080 S | 5/2018 | Seidl |
| 10,010,213 B2 | 7/2018 | Alexander |
| D826,631 S | 8/2018 | Baron |
| D829,042 S | 9/2018 | Duan |
| D829,496 S | 10/2018 | Kim |
| D830,766 S | 10/2018 | Treacy |
| D832,641 S | 11/2018 | Sapire |
| D836,385 S | 12/2018 | Arzunyan |
| 10,143,980 B1 | 12/2018 | Marko |
| 10,188,229 B2 | 1/2019 | Alexander |
| D842,020 S | 3/2019 | Augustyn |
| D847,557 S | 5/2019 | Kraemer |
| 10,299,629 B2 | 5/2019 | Bascom |
| 10,299,632 B2 | 5/2019 | Vu |
| D850,259 S | 6/2019 | Wiggins |
| D853,184 S | 7/2019 | De Groote |
| 10,362,903 B2 | 7/2019 | Mizrahi |
| D856,083 S | 8/2019 | Lawson-Shanks |
| 10,383,482 B1 | 8/2019 | Pamplin |
| 10,391,461 B2 | 8/2019 | Alfoudari |
| D867,806 S | 11/2019 | Bodum |
| D867,807 S | 11/2019 | Bodum |
| D871,831 S | 1/2020 | Liu |
| D873,601 S | 1/2020 | Sirju |
| 10,617,260 B2 | 4/2020 | Sapire |
| D885,124 S | 5/2020 | Yessin |
| D885,824 S | 6/2020 | Neputy |
| D889,260 S | 7/2020 | Hiltser |
| D891,191 S | 7/2020 | Binyk |
| 10,702,837 B1 | 7/2020 | Pamplin |
| D894,679 S | 9/2020 | Cheng |
| D895,348 S | 9/2020 | Vignau-Lous |
| D896,566 S | 9/2020 | Wang |
| 10,792,630 B1 | 10/2020 | Pamplin |
| 10,799,071 B2 | 10/2020 | Pamplin |
| D900,530 S | 11/2020 | Kim |
| 10,828,612 B1 | 11/2020 | Pamplin |
| D903,400 S | 12/2020 | Li |
| D904,822 S | 12/2020 | Koszylko |
| D905,494 S | 12/2020 | Pataki |
| D905,496 S | 12/2020 | Pamplin |
| D908,428 S | 1/2021 | Pamplin |
| D911,107 S | 2/2021 | Pamplin |
| D913,035 S | 3/2021 | McCabe |
| D916,549 S | 4/2021 | Li |
| D918,636 S | 5/2021 | Mangiarotti |
| D918,719 S | 5/2021 | Tamarindo |
| D920,736 S | 6/2021 | Bock |
| D921,419 S | 6/2021 | Yang |
| D927,245 S | 8/2021 | Peng |
| D927,254 S | 8/2021 | Chen |
| D927,924 S | 8/2021 | Lane |
| 11,229,891 B2 | 1/2022 | Pamplin |
| D943,338 S | 2/2022 | Feng |
| D948,940 S | 4/2022 | Pamplin |
| D953,103 S | 5/2022 | Pamplin |
| 2001/0036124 A1 | 11/2001 | Rubenstein |
| 2002/0117566 A1 | 8/2002 | Cheng |
| 2002/0141286 A1 | 10/2002 | Wulf |
| 2004/0159624 A1 | 8/2004 | Miller |
| 2007/0182367 A1 | 8/2007 | Partovi |
| 2007/0209528 A1 | 9/2007 | Chang |
| 2007/0221068 A1 | 9/2007 | Boussemart |
| 2007/0290555 A1 | 12/2007 | Caren |
| 2008/0198691 A1 | 8/2008 | Behar |
| 2008/0217284 A1 | 9/2008 | Roth |
| 2008/0259722 A1 | 10/2008 | Sanford |
| 2008/0265838 A1 | 10/2008 | Garg |
| 2009/0032627 A1 | 2/2009 | Krasznai |

(56) References Cited

U.S. PATENT DOCUMENTS

| | | | |
|---|---|---|---|
| 2010/0005977 | A1 | 1/2010 | Menashes |
| 2010/0301808 | A1 | 12/2010 | David |
| 2011/0024537 | A1 | 2/2011 | Gonzalez |
| 2011/0248108 | A1 | 10/2011 | Carriere |
| 2012/0080549 | A1 | 4/2012 | Rukavina |
| 2012/0167781 | A1 | 7/2012 | Lane |
| 2013/0010568 | A1 | 1/2013 | Bodum |
| 2013/0222991 | A1 | 8/2013 | McWilliams |
| 2014/0151479 | A1 | 6/2014 | Wu |
| 2014/0247686 | A1 | 9/2014 | Arnett |
| 2014/0301155 | A1 | 10/2014 | Montgomery |
| 2015/0023130 | A1 | 1/2015 | Foxlee |
| 2015/0117137 | A1 | 4/2015 | Haney |
| 2015/0165402 | A1 | 6/2015 | King |
| 2015/0283037 | A1 | 10/2015 | Trejo |
| 2015/0374175 | A1 | 12/2015 | Garr |
| 2016/0114935 | A1 | 4/2016 | Rönnholm et al. |
| 2016/0235243 | A1 | 8/2016 | Grassia |
| 2016/0354740 | A1 | 12/2016 | Gonzalez |
| 2017/0104297 | A1 | 4/2017 | Scott |
| 2017/0110898 | A1 | 4/2017 | Kyriakoulis |
| 2018/0028991 | A1 | 2/2018 | Brotzki |
| 2018/0054142 | A1 | 2/2018 | Williams |
| 2018/0146826 | A1 | 5/2018 | Mizrahi |
| 2018/0160855 | A1 | 6/2018 | Krivos |
| 2018/0221836 | A1 | 8/2018 | Ni |
| 2019/0000275 | A1 | 1/2019 | Sapire |
| 2019/0082893 | A1* | 3/2019 | Faulkner-Edwards ............... A47J 43/0761 |
| 2019/0191962 | A1 | 6/2019 | Pieterman |
| 2019/0307287 | A1* | 10/2019 | Magatti ............... A47J 31/5253 |
| 2019/0363567 | A1 | 11/2019 | Kim |
| 2019/0365156 | A1 | 12/2019 | Vu |
| 2020/0061557 | A1 | 2/2020 | Bertsch |
| 2020/0114322 | A1 | 4/2020 | Christoph |
| 2020/0135391 | A1 | 4/2020 | Kwon |
| 2020/0205615 | A1 | 7/2020 | Pamplin |
| 2020/0345181 | A1 | 11/2020 | Potaki |
| 2020/0359842 | A1 | 11/2020 | Koh |
| 2020/0390286 | A1 | 12/2020 | Pamplin |
| 2021/0354100 | A1 | 11/2021 | Sapire |
| 2022/0175192 | A1 | 6/2022 | Ahn |
| 2022/0285984 | A1 | 9/2022 | Pamplin |

FOREIGN PATENT DOCUMENTS

| | | |
|---|---|---|
| CN | 102949118 A | 3/2013 |
| CN | 103841867 A | 6/2014 |
| CN | 104084076 A | 10/2014 |
| CN | 104385455 A | 3/2015 |
| CN | 104473576 A | 4/2015 |
| CN | 104808545 A | 7/2015 |
| CN | 204467878 U | 7/2015 |
| CN | 204520400 | 8/2015 |
| CN | 205006717 U | 2/2016 |
| CN | 105615698 A | 6/2016 |
| CN | 205493613 | 8/2016 |
| CN | 207194642 U | 4/2018 |
| CN | 207444802 U | 6/2018 |
| CN | 207768224 U | 8/2018 |
| CN | 304785260 S | 8/2018 |
| CN | 107080417 B | 10/2018 |
| CN | 108937638 | 12/2018 |
| CN | 209147461 U | 7/2019 |
| CN | 210354282 | 4/2020 |
| EP | 2220980 | 8/2010 |
| GB | 2506926 | 4/2014 |
| GB | 3021494 | 11/2017 |
| JP | D1669689 | 10/2020 |
| WO | 2008047106 | 4/2008 |
| WO | 2017157965 | 9/2017 |
| WO | 2020191437 | 10/2020 |

OTHER PUBLICATIONS

PCT International Search Report, International Application No. PCT/US2020/054447, dated Oct. 29, 2020, 7 pages.
PCT International Search Report and Written Opinion, Application No. PCT PCT/US2020/054471, dated Jan. 5, 2021 (8 pages.).
PCT International Search Report and Written Opinion, Application No. PCT/US19/63089, dated Feb. 19, 2020, dated 11 pages.
ECPURCHASE Portable Blender USB Rechargeable. Date First Available on Amazon.com May 7, 2018. https://www.amazon.com/Portable-Blender-Rechargeable-Single-Personal/dp/B07CXM3CC3/. (Year: 2018) (1 page).
PCT International Search Report and Written Opinion, Application No. PCT/US2022/018497, dated Jun. 16, 2022, 10 pages.
LuwsIdirr Electric Blender, posted at Amazon.com on Nov. 23, 2019, 2 pages, [site visited Jul. 27, 2022]. Available from Internet, URL: <https://www.amazon.com/dp/B081WD4QXC/> (Year: 2019).
Mialoe Portable Juicer Blender, posted at Amazon.com on Oct. 12, 2017, 2 pages, [site visited Jul. 27, 2022]. Available from internet, URL: < (https://www.amazon.com/Portable-Updated-Rechargeable-Magnetic-Electric/dp/B076DFV3KT?th=1> (Year: 2017).

* cited by examiner

ONE BUTTON INTERFACE OF A BLENDER

FIELD OF THE DISCLOSURE

The present disclosure relates to blenders configured to control different blending modes of operation.

BACKGROUND

Blenders are known, typically as consumer-grade home appliances. User interfaces are known, e.g., for home appliances.

SUMMARY

One aspect of the present disclosure relates to a blender configured to blend foodstuffs using different blending modes of operation. In some implementations, the blender may be portable due to its size, and/or its rechargeability. By virtue of true portability, a user can take the blender anywhere and create drinks, shakes, smoothies, baby food, sauces, and/or other concoctions. Once the blender is fully charged, a user can prepare multiple servings quickly and easily. In some implementations, lack of an external power source, much less a reliable external power source, is no longer preventing users from enjoying blended drinks. By virtue of the control interface and corresponding control circuitry described in this disclosure, different blending modes of operation may be available through an easy-to-use control interface. In some implementations, the control interface may use only a single button that is configured to be pushed by the user.

The blender may include a blending component, a base assembly, a container assembly, a control interface, control circuitry, and/or other components. As used herein, the term "foodstuffs" may include ingredients ranging from solid to liquid, from hot to cold or frozen, in any combination. As used herein, the term "ingredient" merely connotates something fit to ingest, and not necessarily nutritional value. For example, ice and/or ice cubes may be ingredients.

As used herein, any association (or relation, or reflection, or indication, or correspondency) involving assemblies, blending components, blades, motors, rotational axes, longitudinal axes, diameters, batteries, couplings, interfaces, buttons, detectors, indicators, magnetic components, caps, rotations, and/or another entity or object that interacts with any part of the blender and/or plays a part in the operation of the blender, may be a one-to-one association, a one-to-many association, a many-to-one association, and/or a many-to-many association or N-to-M association (note that N and M may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
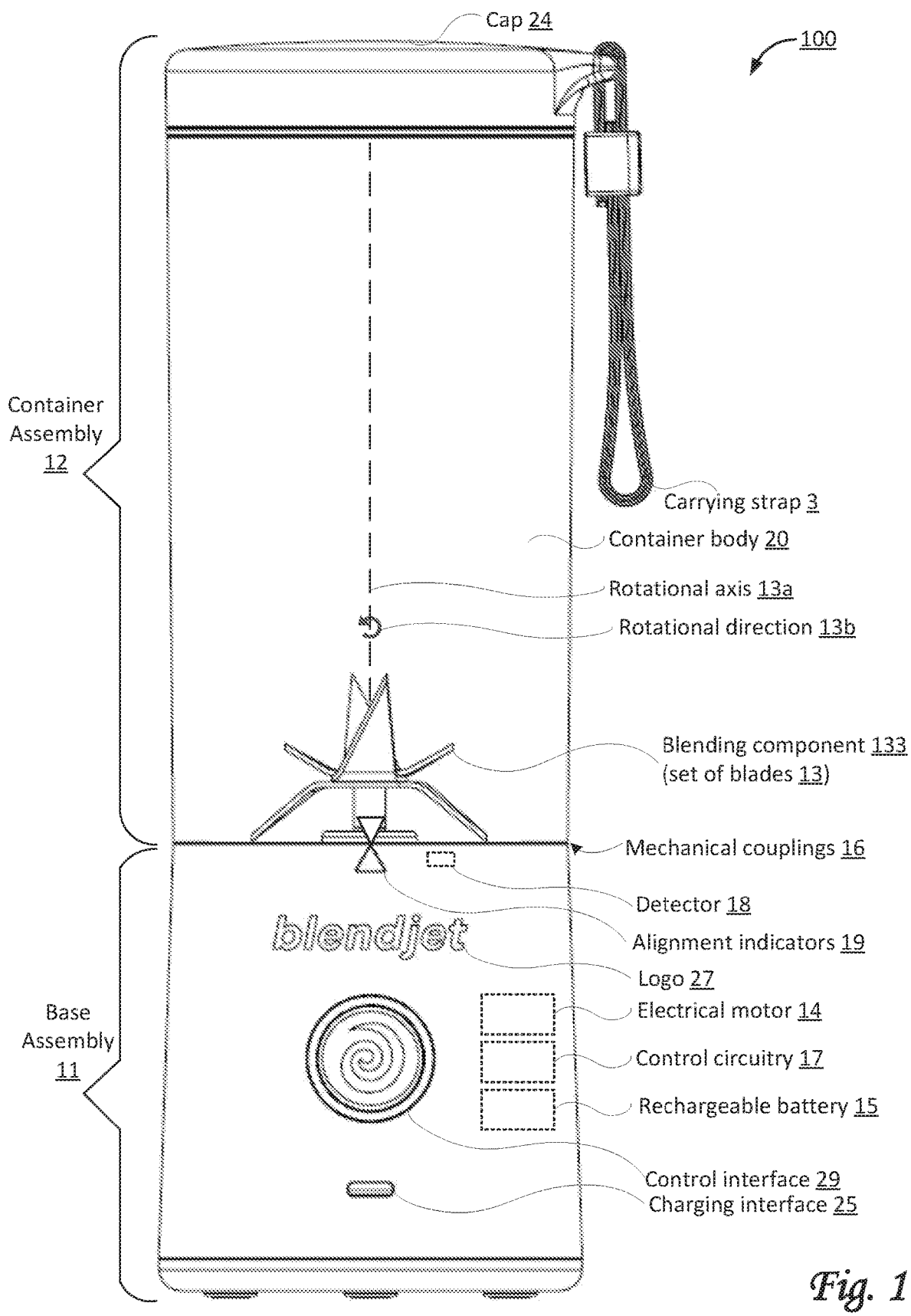
FIG. 1 shows a front view of a blender configured to blend foodstuffs using different blending modes of operation, in accordance with one or more implementations.

FIG. 1 shows a blender 100 configured to blend foodstuffs using different blending modes of operation, in accordance with one or more implementations. Blender 100 may include one or more of a base assembly 11, a container assembly 12, a blending component 133, a control interface 29, control circuitry 17 (depicted in FIG. 1 as a dotted rectangle to indicate this component may be embedded within base assembly 11, and not readily visible from the outside), and/or other components. Base assembly 11 and container assembly 12 may be configured to be coupled during blending by blender 100. For example, in some implementations, base assembly 11 and container assembly 12 may be mechanically coupled, e.g., through one or more threaded couplings. Other types of couplings may be envisioned for blender 100, though leak-proof options are preferred, since most uses include one or more liquid ingredients. In some implementations, control circuitry 17 and/or other components may be included in base assembly 11, e.g., within base assembly 11. For example, one or more of control interface 29, control circuitry 17, electrical motor 14 (depicted in FIG. 1 as a dotted rectangle to indicate this component may be embedded within base assembly 11, and not readily visible from the outside), rechargeable battery 15 (depicted in FIG. 1 as a dotted rectangle to indicate this component may be embedded within base assembly 11, and not readily visible from the outside), and/or other components may be integrated permanently into base assembly 11 such that base assembly 11 forms an integral whole. In some implementations, the phrase integrated permanently may refer to components being integrated such that they are not readily accessible, serviceable, and/or replaceable by a user, or at least not during ordinary usage by the user, including, but not limited to, charging, blending, cleaning, and storing for later use.

Figure 5:
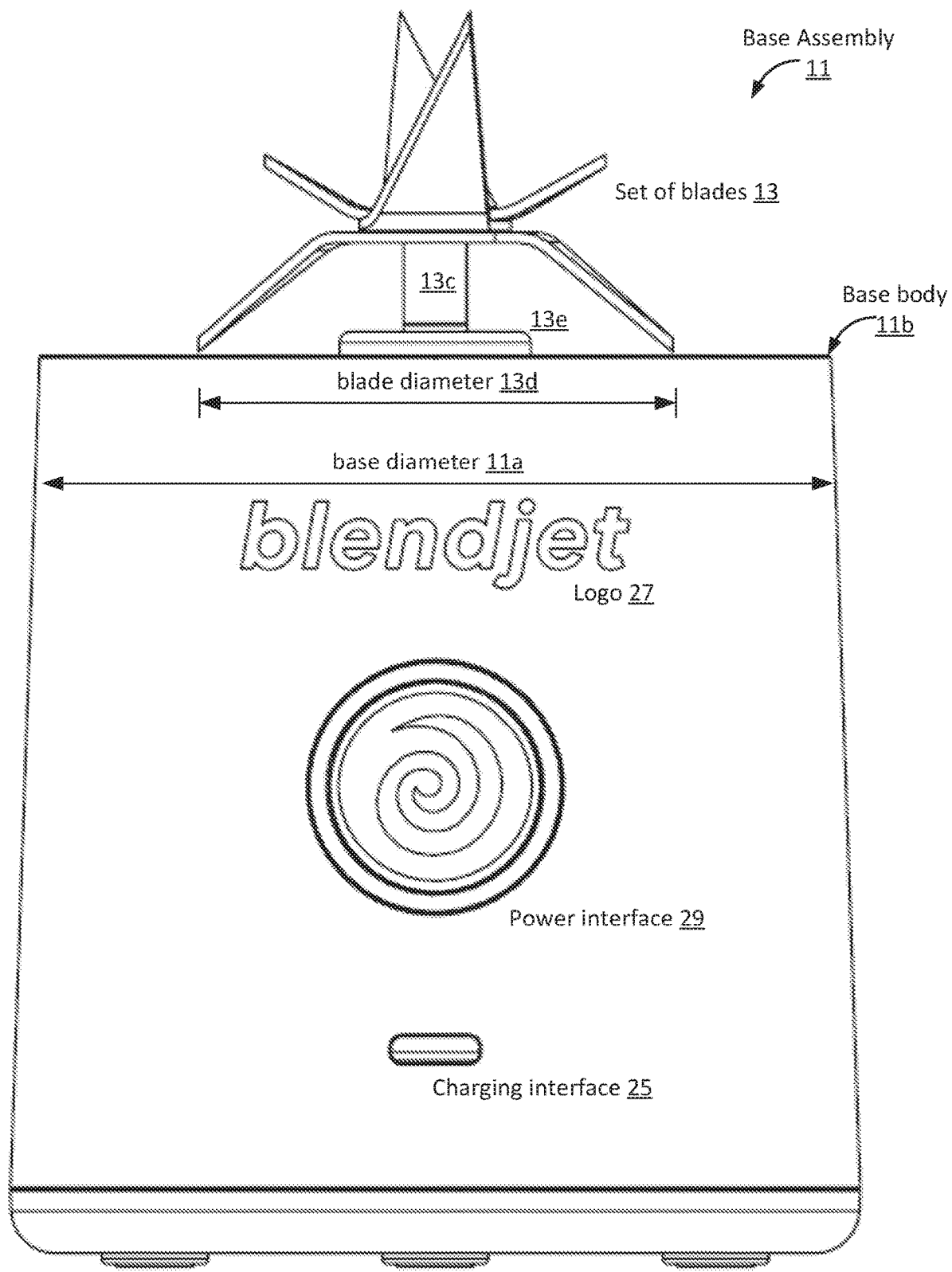
FIG. 5 shows a front view of a base assembly of a blender configured to blend foodstuffs using different blending modes of operation, in accordance with one or more implementations.

In some implementations, base assembly 11 may include one or more of a base body 11b (as depicted in FIG. 5, containing the components of the base assembly 11), blending component 133 (e.g., a set of blades 13, also referred to as a set of one or more blades 13), electrical motor 14, a rechargeable battery 15, a (standardized) charging interface 25, one or more mechanical couplings 16, a detector 18 (depicted in FIG. 1 as a dotted rectangle to indicate this component may be embedded within base assembly 11, and not readily visible from the outside), one or more alignment indicators 19, control interface 29, and/or other components.

Figure 4:
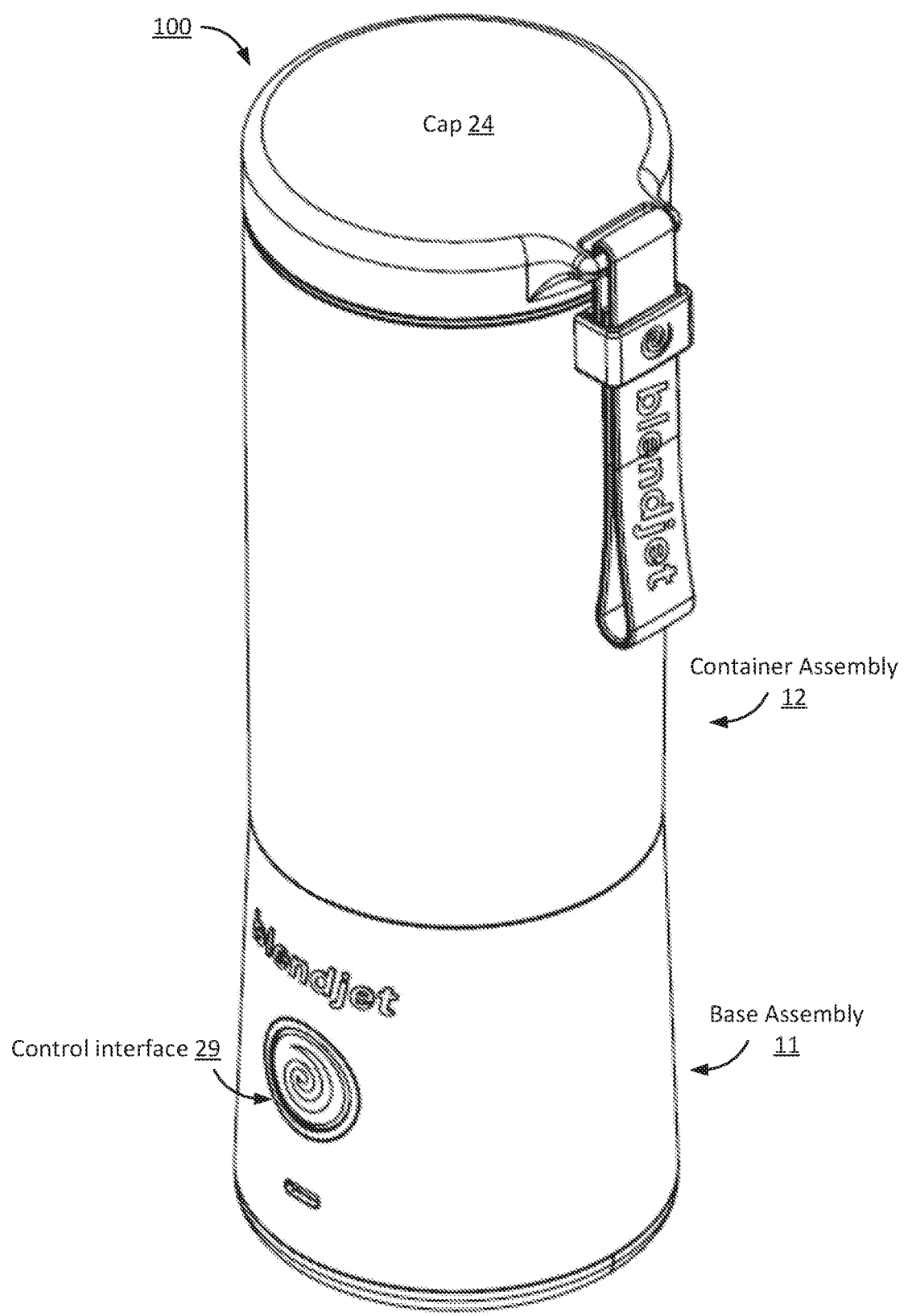
FIG. 4 shows an isometric elevated view of a blender configured to blend foodstuffs using different blending modes of operation, in accordance with one or more implementations.

In some implementations, one or more mechanical couplings 16 may include threaded couplings. By way of non-limiting example, FIG. 4 shows an isometric elevated view of blender 100 configured to blend foodstuffs. For example, one or more mechanical couplings 16 may include a first mechanical coupling and a second mechanical coupling. In some implementations, the first mechanical coupling may be included in base assemble 11, and may be a female threaded coupling configured to fit together with the second mechanical coupling (which may be included in container assembly 12). The first mechanical coupling and the second mechanical coupling may be configured to (temporarily and detachably) couple base assembly 11 to container assemble 12.

Referring to FIG. 1, blending component 133 may include one or more structural components configured to blend foodstuffs, including but not limited to one or more blending bars, one or more blades, and/or other structural components configured to rotate. For example, in some implementations, blending component 133 may include set of blades 13, which may be rotatably mounted to base assembly 11 to blend foodstuffs. Blending component 133 may be configured to rotate around a rotational axis 13a. Rotational axis 13a is depicted in FIG. 1 as a geometric 2-dimensional line extending indefinitely through blending component 133, and is not a physical axis. Rather, rotational axis 13a indicates how blending component 133 rotates in relation to other components of blender 100, in a rotational direction 13b. In some implementations, blending component 133 may be mounted permanently to base assembly 11. In some implementations, set of blades 13 may include 1, 2, 3, 4, 5, or more pairs of blades. In some implementations, a pair of blades may include two blades on opposite sides of rotational axis 13a. In some implementations, a pair of blades may have two blades such that the distal ends of these two blades are at the same horizontal level. In some implementations, as depicted in the upright configuration of blender 100 in FIG. 1, set of blades 13 may include six blades that form 3 pairs of blades. In some implementations, set of blades 13 may include at least two downward blades, which may prevent and/or reduce foodstuffs remaining unblended when disposed under the upward blades. In some implementations, set of blades 13 may include at least four upward blades. In some implementations, including six blades may be preferred over including less than six blades, in particular for blending ice and/or ice cubes. By using more blades, more points of contact will hit the ice at substantially the same time, which reduces the likelihood that a piece of ice is merely propelled rather than broken, crushed, and/or blended, in particular for implementations having limited power (here, the term limited is used in comparison to blenders that are connected to common outlets during blending), such as disclosed herein. As used herein, directional terms such as upward, downward, left, right, front, back, and so forth are relative to FIG. 1 unless otherwise noted.

Referring to FIG. 1, in some implementations, base assembly 11 may have a cylindrical and/or conical shape (apart from blending component 133 and/or set of blades 13). In some implementations, the shape of base assembly 11 may have a base diameter between 2 and 4 inches. In some implementations, the shape of base assembly 11 may have a base diameter between 3 and 3.5 inches. Such a base diameter may improve portability, as well as allow blender 100 to be stored in a cup holder, e.g., in a vehicle. For example, FIG. 5 shows a front view of base assembly 11, depicting a blade diameter 13d (e.g., the diameter of the circle described by rotation of the distal ends of the lowest (and/or widest) pair of blades in set of blades 13) and a base diameter 11a (as measured at or near the top of base assembly 11). In some implementations, blade diameter 13d may refer to the largest diameter of any circle described by rotation of distal ends of pairs of blades in set of blades 13 (or other distal ends of blending component 133), as measured perpendicular to rotation. In some implementations, the orientation of blade diameter 13d may be orthogonal/perpendicular to the direction of rotational axis 13a. In some implementations, the plane of rotation of the distal ends of the blades (or other distal ends of blending component 133) that define blade diameter 13d may be orthogonal/perpendicular to the direction of rotational axis 13a. Blade diameter 13d may refer to a blending bar, or to set of blades 13, and/or to other types of blending components.

Referring to FIG. 1, container assembly 12 may include one or more of a container body 20, a cap 24 (e.g., to prevent spilling during blending), a carrying strap 3 (e.g., configured to carry blender 100), and/or other components. Container body 20 may form a vessel to hold and/or contain foodstuffs within container assembly 12. In some implementations, container body 20 may be a cylindrical body and/or have a cylindrical shape, as depicted in FIG. 4. In some implementations, container body 20 may be open at one or both ends. In some implementations, container body 20 may be closed at the bottom. In some implementations, the dimensions of container assembly 12 may be such that the internal volume of container assembly 12 can hold 8, 10, 12, 14, 16, 18, 20, 22, 24, 28, 32, 36, 48, or more ounces. In some implementations, container assembly 12 and/or container body 20 may have cylindrical shapes.

Referring to FIG. 1, electrical motor 14 may be configured to rotationally drive blending component 133. In some implementations, electrical motor 14 may operate at a voltage between 5V and 15V. In one or more preferential implementations, electrical motor 14 may operate at a voltage of about 7.4V. In some implementations, electrical motor 14 may be configured to spin blending component 133 at a maximum speed between 20,000 rotations per minute (RPM) and 40,000 RPM. In one or more preferential implementations, electrical motor 14 may spin blending component 133 at a maximum speed of about 22,000 RPM. Electrical motor may be configured to be powered by rechargeable battery 15. Simultaneously, in some implementations, electrical motor 14 may be further configured to be powered through (standardized) charging interface 25, though that may not be the preferred way of operating blender 100. In one or more preferential implementations, no power is (or need be) supplied to electrical motor 14 from an external power source during blending by blender 100. In some implementations, control circuit 17 may be configured to control electrical motor 14 during rotation of blending component 133. For example, control circuit 17 may control the speed of the rotation of blending component 133 during blending by blender 100.

Referring to FIG. 1, rechargeable battery 15 may be configured to power electrical motor 14. In some implementations, rechargeable battery 15 may be configured to power electrical motor 14 such that, during blending by blender 100, no power is supplied to electrical motor 14 from an external power source. In some implementations, rechargeable battery 15 may be non-removable. As used herein, the term "non-removable" may mean not accessible to users during common usage of blender 100, including charging, blending, cleaning, and storing for later use. In some implementations, rechargeable battery 15 may be not user-replaceable (in other words, non-removable). In some implementations, rechargeable battery 15 may be user-replaceable. In some implementations, rechargeable battery 15 may be store-bought. In some implementations, rechargeable battery 15 may have a capacity between 1000 mAh and 8000 mAh. In one or more preferential implementations, rechargeable battery 15 may have a capacity of about 2500 mAh. In some implementations, control circuit 17 may be configured to control charging of rechargeable battery 15. For example, control circuit 17 may control the transfer of electrical power through standardized charging interface 25 into rechargeable battery 15. For example, responsive to a detection that rechargeable battery 15 is fully charged, control circuit 17 may prevent the transfer of electrical power through standardized charging interface 25 into rechargeable battery 15.

Charging interface 25 may be standardized and may be configured to conduct electrical power to rechargeable battery 15. In some implementations, charging interface 25 may be configured to conduct electrical power to charge rechargeable battery 15, e.g., from an external power source. In some implementations, charging interface 25 may be configured to support wireless charging of rechargeable battery 15, e.g., from an external power source, including but not limited to induction-based charging. In some implementations, charging interface 25 may be a universal serial bus (USB) port configured to receive an electrical connector for charging rechargeable battery 15. A USB port is merely one type of standardized charging interface. Other standards are contemplated within the scope of this disclosure. The electrical connector may be connected to an external power source. In some implementations, charging interface 25 may be covered for protection and/or other reasons.

Detector 18 may be configured to detect whether mechanical couplings 16 are coupled in a manner operable and suitable for blending by blender 100. In some implementations, operation of detector 18 may use one or more magnetic components. For example, in some implementations, one or more magnetic components are included in container body 20. Engagement may be detected responsive to these one or more magnetic components being aligned and sufficiently close to one or more matching magnetic components that may be included in base assembly 11. In some implementations, blender 100 may include one or more alignment indicators 19, depicted in FIG. 1 as matching triangles, to visually aid the user in aligning base assembly 11 with container assembly 12 in a manner operable and suitable for blending. In some implementations, one or more alignment indicators 19 may be in the front, in the back, and/or in other parts of blender 100.

Control interface 29 may be part of the user interface of blender 100. Through the user interface, a user of blender 100 may control the operation of blender 100, including but not limited to transitions between different modes of operation. For example, the different modes of operation may include multiple blending modes of operation. For example, in some implementations, the modes of operation include a ready-to-blend mode. During the ready-to-blend mode, blender 100 is not blending, but blender 100 may be ready to blend. For example, blender 100 may have sufficient power through rechargeable battery 15, and mechanical couplings 16 may be coupled in a manner operable and suitable for blending by blender 100. The transitions may include transitions from the ready-to-blend mode to one of the blending modes of operation, and/or vice versa.

In some implementations, the blending modes of operation of blender 100 may include at least two blending modes of operation: a fixed-time blending mode of operation, a variable-time blending mode of operation, and/or other blending modes of operation. For example, during the fixed-time blending mode of operation of blender 100, control circuitry 17 may be configured to effectuate rotation of blending component 133 (in other words, to effectuate blending) for a particular duration. In some implementations, the particular duration may be limited to a predetermined time limit. For example, the predetermined time limit may be 10 seconds, 20 seconds, 30 seconds, 40 seconds, 50 seconds, 1 minute, and/or other time limit. In some implementations, the predetermined time limit may be between 10 and 60 seconds, between 20 and 50 seconds, between 30 and 40 seconds, between 1 and 2 minutes, and/or have another range of durations. For example, during the variable-time blending mode of operation of blender 100, control circuitry 17 may be configured to effectuate rotation of blending component 133 for one or more durations. Individual ones of the one or more durations may correspond to individual occurrences of the button of control interface 29 being pushed down by the user. In other words, as long as the user holds the button pushed down, blender 100 blends. The user may use short pulses or longer pulses, or any combination as desired during the variable-time blending mode of operation of blender 100.

In some implementations, control interface 29 may include one or more buttons. For example, a button of control interface 29 may be configured to be pushed by the user (as used herein, a push may be released quickly or may be held down, or may be followed by one or more additional pushes, e.g. in the case of a double push). In some implementations, control interface 29 includes exactly one button. For example, in some implementations, the button may be the only user-manipulatable portion of control interface 29, such that no other button or user interface component controls the operation of blender 100 or the transitions between different blending modes of operation used by blender 100. In some implementations, control interface 29 may include one or more controllable light-emitting components. For example, the light-emitting components may be LEDs or other types of lights. In some implementations, the one or more controllable light-emitting components may be configured to selectively light up. In some implementations, the one or more controllable light-emitting components may be configured to indicate, to a user, a current mode of operation of blender 100, an occurrence of a transition between different modes of operation, a warning for the user, and/or other information regarding the operation of blender 100. For example, the one or more controllable light-emitting components may use different colors, intensities, patterns, sequences, and/or other combinations of light to provide information to the user. In some implementations, control interface 29 may include one or more controllable sound-emitting components, such as a speaker, configured to selectively emit sound. In some implementations, the one or more controllable sound-emitting components may be configured to indicate, to a user, a current mode of operation of blender 100, an occurrence of a transition between different modes of operation, a warning for the user, and/or other information regarding the operation of blender 100. For example, the one or more controllable sound-emitting components may use different frequencies, volumes, patterns, sequences, and/or other combinations of sound to provide information to the user. In some implementations, control interface 29 may include one or more haptic components to provide feedback to a user.

Control circuitry 17 may be configured to control different functions and/or operations of blender 100, including but not limited to turning blender 100 on and off, transitioning between different modes of operation, charging of rechargeable battery 15, controlling of electrical motor 14 regarding and/or during rotation of blending component 133, determining whether mechanical couplings 16 are engaged properly for blending, controlling or otherwise using control interface 29, and/or performing other functions for blender 100. In some implementations, control circuitry 17 may be configured to prevent rotation of blending component 133 responsive to a determination that mechanical couplings 16 are not engaged (or not engaged properly for the intended operation of blender 100). In some implementations, control circuitry 17 may be configured to use control interface 29 to convey information regarding the operational status of blender 100 to a user. For example, control interface 29 may include a light that can illuminate in various colors and/or patterns. In some implementations, control circuitry 17 may be implemented as a printed circuit board (PCB).

In some implementations, control circuitry 17 may be configured to make detections regarding one or more buttons of control interface 29. For example, control circuitry may detect whether a button of control interface 29 has been pushed by a user, or released, or pushed again. Control circuitry 17 may be configured to make different types of detections, including but not limited to first, second, third, fourth types of detections. A first type of detections may indicate occurrences of the user single-pushing a button of control interface 29. A second type of detections may indicate occurrences of the user double-pushing a button of control interface 29. In some implementations, a third type of detections may indicate occurrences of the user pushing a button of control interface 29 and holding the button pushed down for at least a predetermined duration. The predetermined duration may be at least 2 seconds, at least 3 seconds, at least 4 seconds, at least 5 seconds, at least between 2 and 4 seconds, at least between 3 and 5 seconds, and/or another (range of) duration. In some implementations, a fourth type of detections may indicate occurrences of any type of push of a button of control interface 29 by the user.

In some implementations, control circuitry 17 may be configured to control operation of control interface 29 to enable transitions between different modes of operation. The transitions may include a first, second, third, fourth, fifth transition, and so forth. For example, a first transition may be from the ready-to-blend mode to the fixed-time blending mode of operation. In some implementations, the first transition may occur responsive to an occurrence of the first type of detections (in the ready-to-blend mode). For example, a second transition may be from the ready-to-blend mode to the variable-time blending mode of operation. In some implementations, the second transition may occur responsive to an occurrence of the second type of detections (in the ready-to-blend mode). In some implementations, a third transition may be from the variable-time blending mode of operation to the ready-to-blend mode. In some implementations, the third transition may occur responsive to an occurrence of a particular type of detections (in the variable-time blending mode of operation). For example, the particular type of detection may be a detection of an idle duration during which a button of control interface 29 is not being pushed by the user. For example, the idle duration may be at least 2 seconds, at least 3 seconds, at least 4 seconds, at least 5 seconds, at least 6 seconds, at least 7 seconds, at least 8 seconds, at least between 2 and 4 seconds, at least between 3 and 5 seconds, at least between 4 and 6 seconds, at least between 5 and 7 seconds, and/or another (range of) duration. In other words, the variable-time blending mode of operation may automatically time-out responsive to no push by the user being detection in a timely manner. In some implementations, a fourth transition may be from the fixed-time blending mode of operation to the ready-to-blend mode. In some implementations, the fourth transition may occur responsive to an individual occurrence of the button of control interface 29 being pushed by the user prior to completion, during the fixed-time blending mode of operation, of the particular duration of the rotation of blending component 133. For example, in some implementations, the fourth transition may occur responsive to an occurrence of the fourth type of detections. For example, a fifth transition may be from the fixed-time blending mode of operation to the ready-to-blend mode. In some implementations, the fifth transition may occur automatically responsive to completion of the particular duration of the rotation of blending component 133 (in other words, after the predetermined time limit of, say, 30 seconds).

In some implementations, the transitions may include a sixth and seventh transition, and so forth. In some implementations, the sixth transition may be from the ready-to-blend mode to a locked mode of operation. In some implementations, the seventh transition may be from the locked mode of operation to the ready-to-blend mode. In some implementations, the sixth transition may occur responsive to an individual occurrence of the third type of detections (except, for example, using a predetermined duration of holding the button pressing down of at least 4 seconds, at least 5 seconds, at least 6 seconds, at least 7 seconds, at least between 4 and 6 seconds, at least between 5 and 7 seconds, and/or another (range of) duration. In some implementations, the seventh transition may occur responsive to an individual occurrence of the third type of detections. For example, during an unlocked mode of operation (e.g., the ready-to-blend mode), control circuitry 17 may be configured to transition to a locked mode of operation. For example, during a locked mode of operation, control circuitry 17 may be configured to transition to an unlocked mode of operation (e.g., the ready-to-blend mode). In some implementations, control circuitry 17 may be configured to prevent rotation of blending component 133 in the locked mode of operation. In some implementations, control circuitry 17 may be configured to allow rotation of blending component 133 in the unlocked mode of operation (e.g., the ready-to-blend mode).

In some implementations, control by a user of blender 100 may be based on a switch (not shown), a button, a touch-screen (not shown), voice-controlled operation (not shown), gesture-based operation (not shown), and/or other types of user interfaces suitable to turn consumer appliances on and off. Control interface 29 (e.g., through one or more light-emitting components) may be configured to illuminate in various colors (red, blue, purple, etc.) and/or patterns (solid, fast blinking, slow blinking, alternating red and blue, etc.). Control interface 29 may convey information regarding the operational status of blender 100 to a user. The operational status of blender 100 may be determined by control circuitry 17. Control interface 29 may be controlled by control circuitry 17. For example, if control interface 29 is solid purple, blender 100 may be charging and/or insufficiently charged to blend. For example, if control interface 29 is solid blue, blender 100 may be ready for blending (e.g., in the ready-to-blend mode). For example, if control interface 29 is alternating red and blue, blender 100 may not be ready for blending due to base assembly 11 and container assembly 12 not being coupled properly and/or fully. For example, in some implementations, threaded couplings between assembly 11 and container assembly 12 may need to be tightened sufficiently for proper blending, and control interface 29 may warn the user when the threaded couplings are not tightened sufficiently and/or correctly.

Figure 3A:
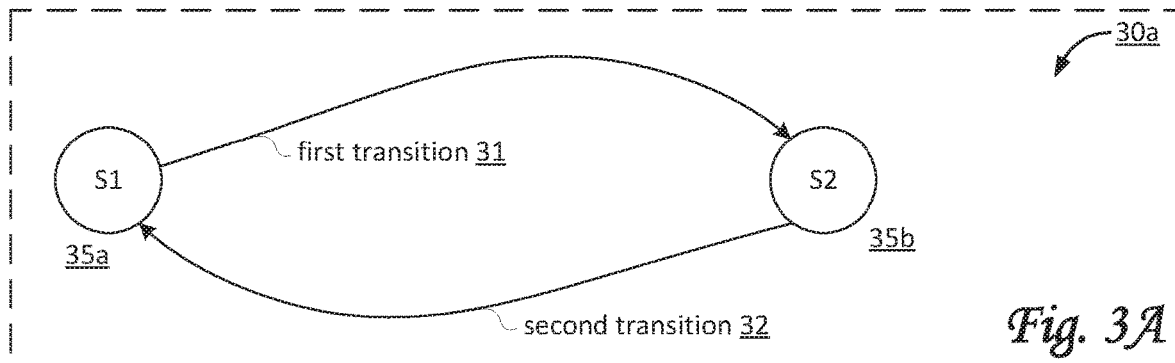
FIGS. 3A-3B-3C-3D-3E-3F-3G-3H illustrate state transitions in state diagrams as may be used by a blender configured to blend foodstuffs using different blending modes of operation, in accordance with one or more implementations.

By way of non-limiting example, FIG. 3A illustrates state transitions in a state diagram 30a as may be used by blender 100, e.g., responsive to different types of detections regarding control interface 29 being manipulated by a user as described elsewhere in this disclosure. As depicted, state diagram 30a may include a first state 35a (labeled "S1") and a second state 35b (labeled "S2"). First state 35a may correspond to a ready-to-blend mode of blender 100. Second state 35b may correspond to a fixed-time blending mode of operation of blender 100. As depicted here, a first transition 31 may transition the mode of operation of blender 100 from first state 35a to second state 35b. A second transition 32 may transition the mode of operation of blender 100 from second state 35b to first state 35a. First transition 31 may occur responsive to detection of the first type of detection. Second transition 32 may occur automatically, e.g., after completion of a fixed-time blending operation.

Figure 3B:
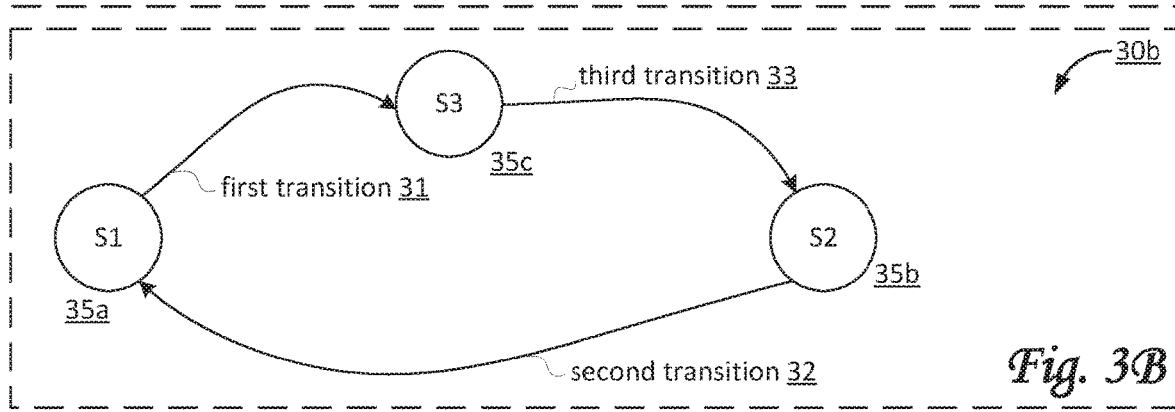

By way of non-limiting example, FIG. 3B illustrates state transitions in a state diagram 30b as may be used by blender 100, e.g., responsive to different types of detections regarding control interface 29 being manipulated by a user as described elsewhere in this disclosure. As depicted, state diagram 30b may include a first state 35a (labeled "S1"), a second state 35b (labeled "S2"), and a third state 35c (labeled "S3"). First state 35a may be similar as described regarding FIG. 3A. Second state 35b may correspond to a fixed-time blending mode of operation of blender 100. Third state 35c may correspond to a different and/or intermediate mode of operation of blender 100. As depicted in state diagram 30b, a first transition 31 may transition the mode of operation of blender 100 from first state 35a to third state 35c. A second transition 32 may transition the mode of operation of blender 100 from second state 35b to first state 35a. A third transition 33 may transition the mode of operation of blender 100 from third state 35c to second state 35b. First transition 31 may occur responsive to detection of the first type of detection. Third transition 33 may occur responsive to completion of operations during third state 35c. Second transition 32 may occur automatically.

Figure 3C:
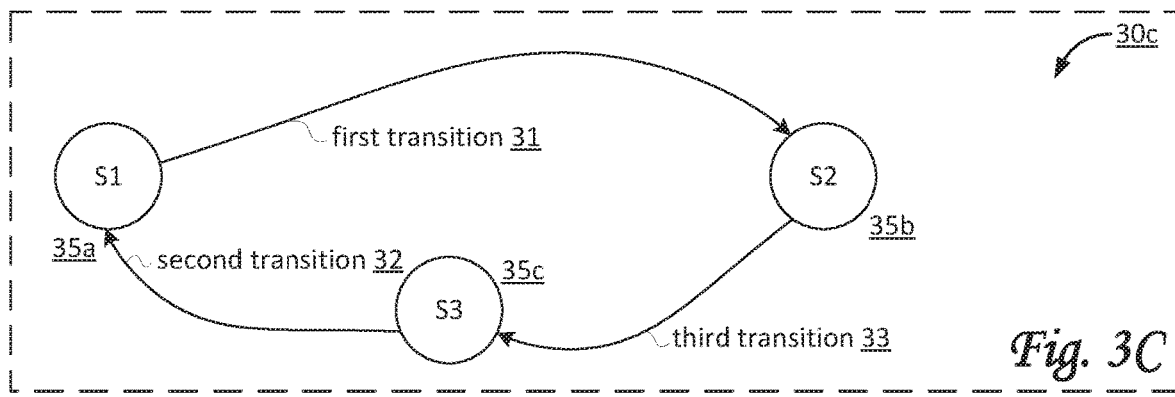

By way of non-limiting example, FIG. 3C illustrates state transitions in a state diagram 30c as may be used by blender 100, e.g., responsive to different types of detections regarding control interface 29 being manipulated by a user as described elsewhere in this disclosure. As depicted, state diagram 30c may include a first state 35a (labeled "S1"), a second state 35b (labeled "S2"), and a third state 35c (labeled "S3"). First state 35a may be similar as described regarding FIG. 3A. Second state 35b may correspond to a fixed-time blending mode of operation of blender 100. Third state 35c may correspond to a variable-time blending mode of operation of blender 100. As depicted in state diagram 30c, a first transition 31 may transition the mode of operation of blender 100 from first state 35a to second state 35b. A second transition 32 may transition the mode of operation of blender 100 from third state 35c to first state 35a. A third transition 33 may transition the mode of operation of blender 100 from second state 35b to third state 35c. First transition 31 may occur responsive to detection of the first type of detection. Third transition 33 may occur responsive to detection of a particular type of detection. Second transition 32 may occur responsive to detection of a given type of detection, and/or automatically after a time-out.

Figure 3D:
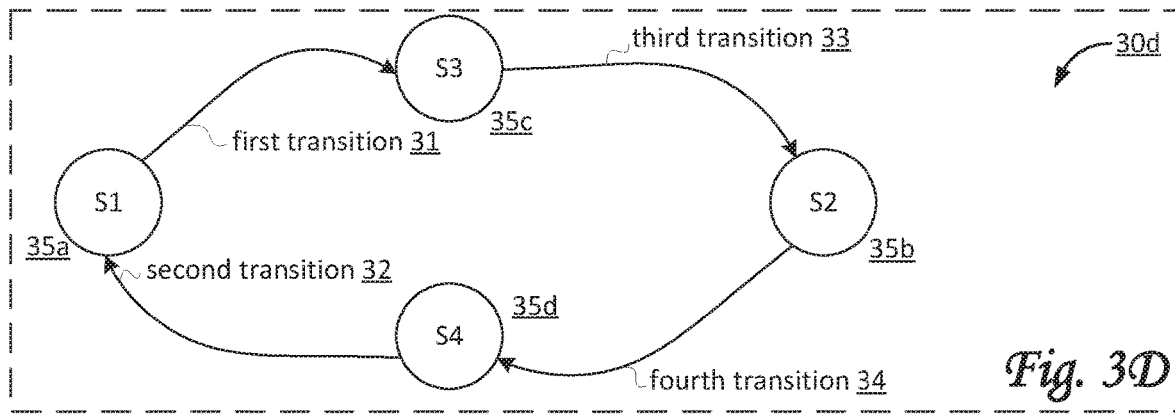

By way of non-limiting example, FIG. 3D illustrates state transitions in a state diagram 30d as may be used by blender 100, e.g., responsive to different types of detections regarding control interface 29 being manipulated by a user as described elsewhere in this disclosure. As depicted, state diagram 30c may include a first state 35a (labeled "S1"), a second state 35b (labeled "S2"), a third state 35c (labeled "S3"), and a fourth state 35d (labeled "S4"). First state 35a may be similar as described regarding FIG. 3A. Second state 35b may correspond to a fixed-time blending mode of operation of blender 100. Third state 35c and fourth state 35d may correspond to temporary modes of operation of blender 100. As depicted in state diagram 30d, a first transition 31 may transition the mode of operation of blender 100 from first state 35a to third state 35c. A second transition 32 may transition the mode of operation of blender 100 from fourth state 35d to first state 35a. A third transition 33 may transition the mode of operation of blender 100 from third state 35c to second state 35b. A fourth transition 34 may transition the mode of operation of blender 100 from second state 35b to fourth state 35d. First transition 31 may occur responsive to detection of the first type of detection. Second transition 32 may occur responsive to a particular type of detection, or automatically. Third transition 33 may occur responsive to completion of a predefined blending operation. Fourth transition 34 may occur responsive to a given type of detection.

Figure 3E:
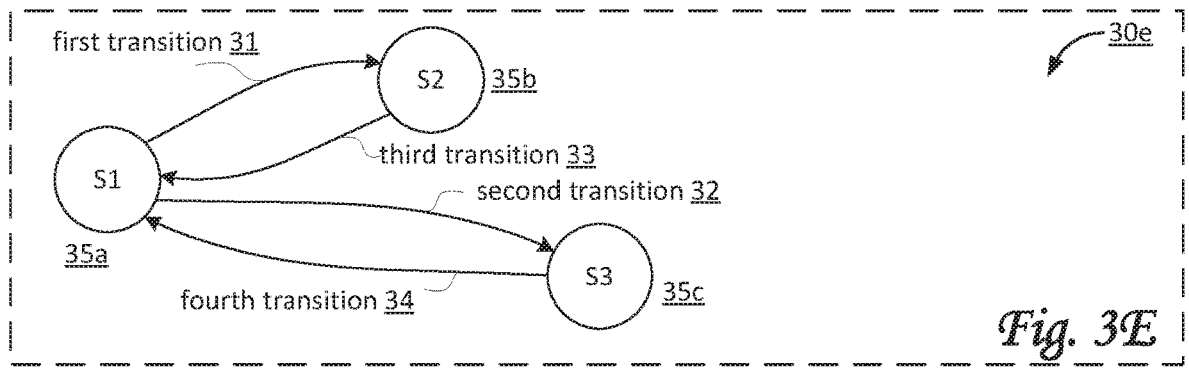

By way of non-limiting example, FIG. 3E illustrates state transitions in a state diagram 30e as may be used by blender 100, e.g., responsive to different types of detections regarding control interface 29 being manipulated by a user as described elsewhere in this disclosure. As depicted, state diagram 30e may include a first state 35a (labeled "S1"), a second state 35b (labeled "S2"), and a third state 35c (labeled "S3"). First state 35a may correspond to a ready-to-blend mode of blender 100. Second state 35b may correspond to a fixed-time blending mode of operation of blender 100. Third state 35c may correspond to a variable-time blending mode of operation of blender 100. As depicted here, a first transition 31 may transition the mode of operation of blender 100 from first state 35a to second state 35b. A second transition 32 may transition the mode of operation of blender 100 from first state 35a to third state 35c. A third transition 33 may transition the mode of operation of blender 100 from second state 35b to first state 35a. A fourth transition 34 may transition the mode of operation of blender 100 from third state 35c to first state 35a. First transition 31 may occur responsive to detection of the first type of detection (e.g., a single push of a button). Second transition 32 may occur responsive to detection of the second type of detection (e.g., a double push of the button). Third transition 33 may occur responsive to detection of the third type of detection. Fourth transition 34 may occur responsive to detection of the fourth type of detection.

Figure 3F:
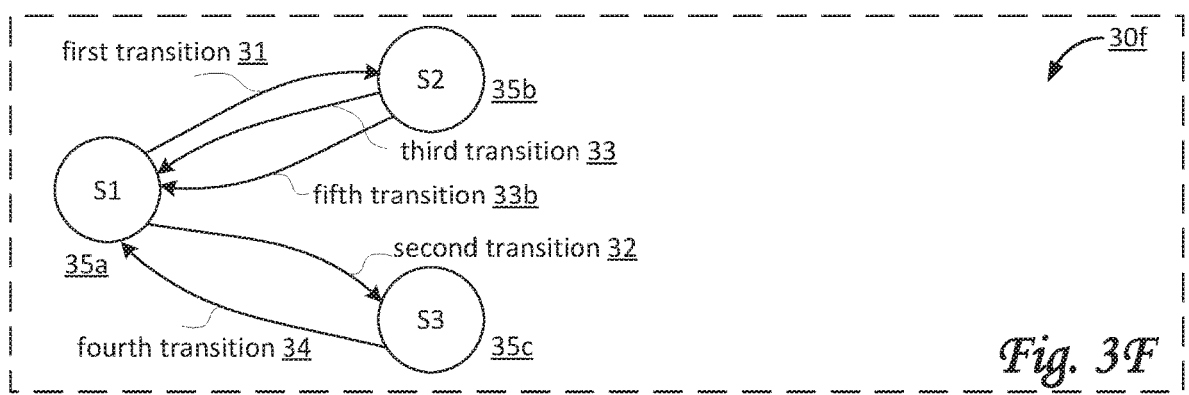

By way of non-limiting example, FIG. 3F illustrates state transitions in a state diagram 30f as may be used by blender 100, e.g., responsive to different types of detections regarding control interface 29 being manipulated by a user as described elsewhere in this disclosure. As depicted, state diagram 30f may include a first state 35a (labeled "S1"), a second state 35b (labeled "S2"), and a third state 35c (labeled "S3"). First state 35a may correspond to a ready-to-blend mode of blender 100. Second state 35b may correspond to a fixed-time blending mode of operation of blender 100. Third state 35c may correspond to a variable-time blending mode of operation of blender 100. As depicted here, a first transition 31, a second transition 32, a third transition 33, and a fourth transition 34 may transition modes of operation in a manner similar to FIG. 3E. Fifth transition 33b may transition the mode of operation of blender 100 from second state 35b to first state 35a. Fifth transition 33b may occur responsive to detection of the fifth type of detection (e.g., a single push of a button while blender 100 is blending during the fixed-time blending mode of operation).

Figure 3G:
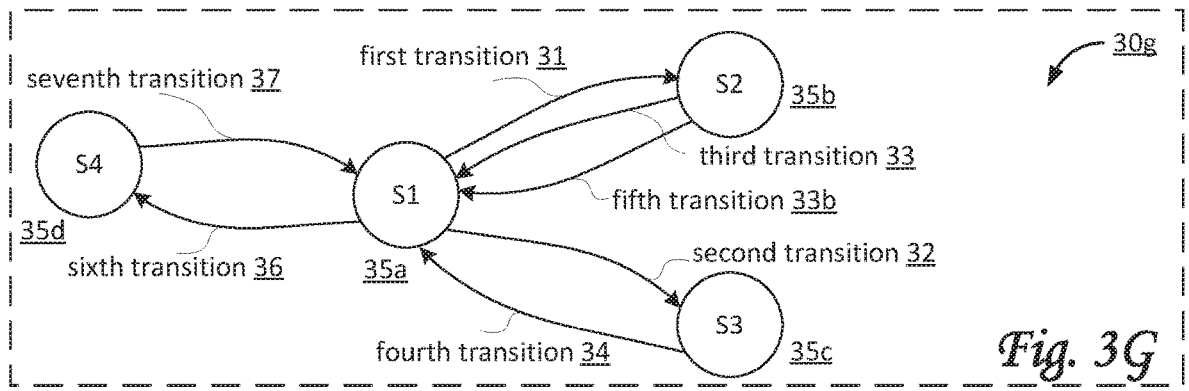

By way of non-limiting example, FIG. 3G illustrates state transitions in a state diagram 30g as may be used by blender 100, e.g., responsive to different types of detections regarding control interface 29 being manipulated by a user as described elsewhere in this disclosure. As depicted, state diagram 30g may include a first state 35a (labeled "S1"), a second state 35b (labeled "S2"), a third state 35c (labeled "S3"), and a fourth state 35d (labeled "S4"). First state 35a may correspond to a ready-to-blend mode of blender 100 (which is also an unlocked mode of operation). Second state 35b may correspond to a fixed-time blending mode of operation of blender 100. Third state 35c may correspond to a variable-time blending mode of operation of blender 100. Fourth state 35d may correspond to a locked mode of operation of blender 100. As depicted here, a first transition 31, a second transition 32, a third transition 33, a fourth transition 34, and a fifth transition 33b may transition modes of operation in a manner similar to FIG. 3F. Sixth transition 36 may transition the mode of operation of blender 100 from first state 35a to fourth state 35d. Seventh transition 37 may transition the mode of operation of blender 100 from fourth state 35d to first state 35a. Sixth transition 36 may occur responsive to detection of the third type of detection (e.g., a single push of a button held down for at least 6 seconds while blender 100 is in the ready-to-blend mode). Seventh transition 37 may occur responsive to detection of the third type of detection (e.g., a single push of a button held down for at least 6 seconds while blender 100 is in the locked mode of operation).

Figure 3H:
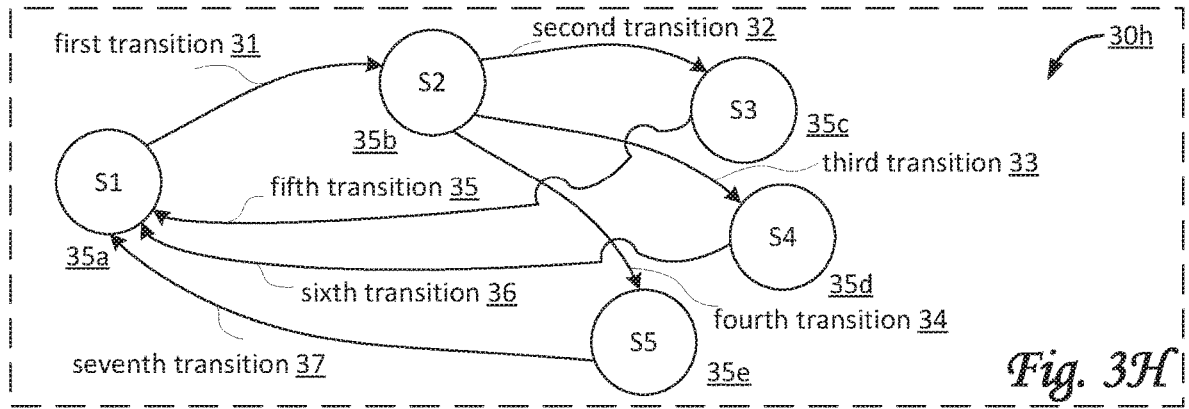

By way of non-limiting example, FIG. 3H illustrates state transitions in a state diagram 30h as may be used by blender 100, e.g., responsive to different types of detections regarding control interface 29 being manipulated by a user as described elsewhere in this disclosure. As depicted, state diagram 30g may include a first state 35a (labeled "S1"), a second state 35b (labeled "S2"), a third state 35c (labeled "S3"), a fourth state 35d (labeled "S4"), and a fifth state 35e (labeled "S5"). First state 35a may correspond to a ready-to-blend mode of blender 100. Second state 35b may correspond to another mode of blender 100 (as described below). Third state 35c may correspond to a fixed-time mode of blender 100. Fourth state 35d may correspond to a variable-time mode of blender 100. Fifth state 35e may correspond to a locked mode of blender 100. As depicted here, a first transition 31 may transition the mode of operation of blender 100 from first state 35a to second state 35b. A second transition 32 may transition the mode of operation of blender 100 from second state 35b to third state 35c. A third transition 33 may transition the mode of operation of blender 100 from second state 35b to fourth state 35d. A fourth transition 34 may transition the mode of operation of blender 100 from second state 35b to fifth state 35e. A fifth transition 35 may transition the mode of operation of blender 100 from third state 35c to first state 35a. A sixth transition 36 may transition the mode of operation of blender 100 from fourth state 35d to first state 35a. A seventh transition 37 may transition the mode of operation of blender 100 from fifth state 35e to first state 35a.

Regarding FIG. 3H, first transition 31 may occur responsive to detection of the first type of detection, i.e., a single push that pushes down the button of control interface 29. In this case, at this point, a single push could be followed by no other pushes, by another push, or it could be held down for a relatively longer duration (say, 6 seconds). Second transition 32 may occur responsive to a detection of a release of the button of control interface 29, and no other push following the first push. This may effectuate the fixed-time blending mode of operation. Third transition 33 may occur responsive to detection of the first type of detection, i.e., another single push that pushes down the button of control interface 29. Third transition 33 may occur responsive to a detection of a second single push, which may in effect be a double push (when considered from the starting point of the ready-to-blend mode). This may effectuate the variable-time blending mode of operation. Fourth transition 34 may occur responsive to detection of the third type of detection, i.e., the button of control interface 29 is held down for a relatively longer duration (say, 6 seconds). This may effectuate the locked mode of operation. Fifth transition 35 may occur either automatically (when the fixed duration operation has completed) or responsive to detection of the fourth type of detection, i.e. any push of the button of control interface 29 before completion of the fixed duration operation. Sixth transition 36 may occur responsive to a detection of an idle duration during which the button of the control interface is not being pushed by the user. Seventh transition 37 may occur responsive to detection of the third type of detection (e.g., the single push of the button is held down for at least 6 seconds while blender 100 is in the ready-to-blend mode of operation).

Figure 2:
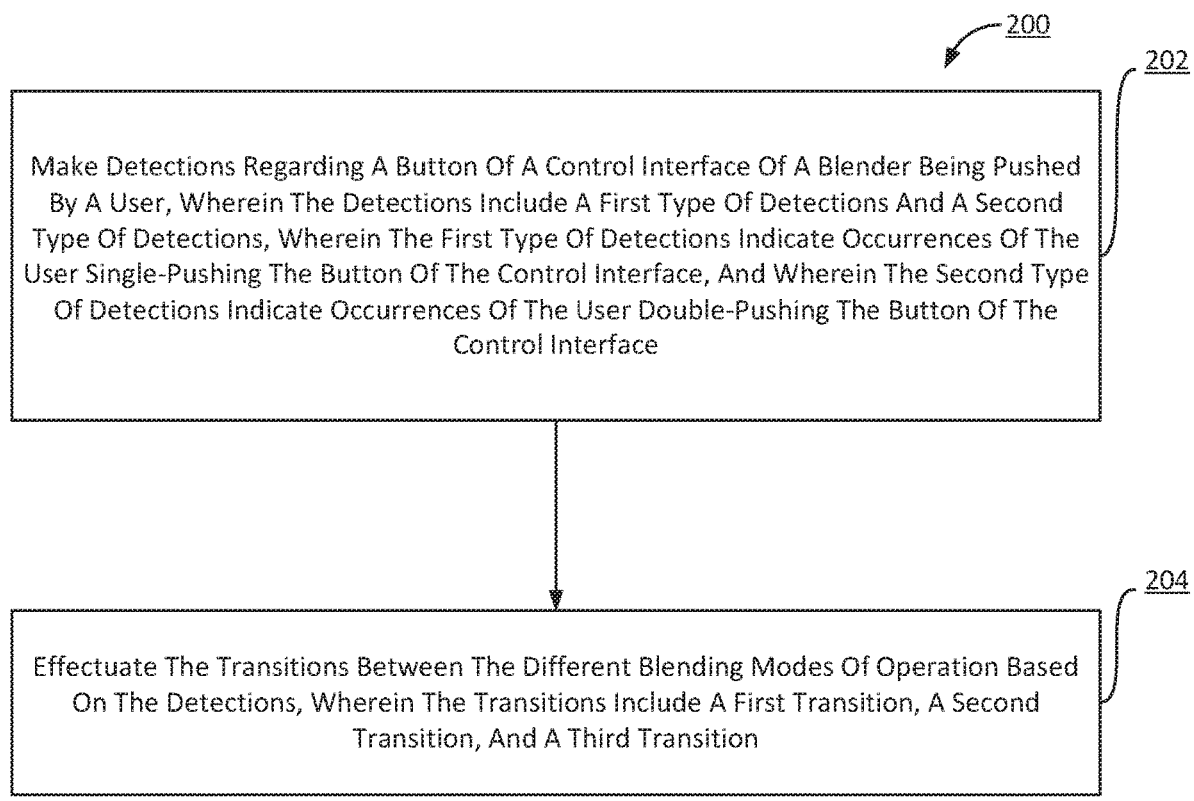
FIG. 2 shows a method regarding for transitioning between different blending modes of operation of a blender and a ready-to-blend mode, in accordance with one or more implementations.

FIG. 2 illustrates a method 200 for transitioning between different blending modes of operation of a blender and a ready-to-blend mode, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, detections are made regarding a button of a control interface of the blender being pushed by a user. The detections include a first type of detections and a second type of detections. The first type of detections indicate occurrences of the user single-pushing the button of the control interface. The second type of detections indicate occurrences of the user double-pushing the button of the control interface. In some embodiments, operation 202 is performed by control circuitry the same as or similar to control circuitry 17 (shown in FIG. 1 and described herein).

At an operation 204, the transitions are effectuated between the different blending modes of operation based on the detections. The transitions include a first transition from the ready-to-blend mode to the fixed-time blending mode of operation, a second transition from the ready-to-blend mode to the variable-time blending mode of operation, and a third transition from the variable-time blending mode of operation to the ready-to-blend mode. The first transition occurs responsive to an occurrence of the first type of detections, wherein, during the fixed-time blending mode of operation, the control circuitry is configured to effectuate the rotation of the blending component for a particular duration. The particular duration is limited to a predetermined time limit. The second transition occurs responsive to an occurrence of the second type of detections, wherein, during the variable-time blending mode of operation, the control circuitry is configured to effectuate the rotation of the blending component for one or more durations. Individual ones of the one or more durations correspond to individual occurrences of the button of the control interface being pushed down by the user. The third transition occurs automatically responsive to a detection of an idle duration during which the button of the control interface is not being pushed by the user. In some embodiments, operation 204 is performed by control circuitry the same as or similar to control circuitry 17 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A blender configured to blend foodstuffs using different blending modes of operation, the blender comprising:
   a base assembly, a container assembly, a blending component, a control interface, and control circuitry,
   wherein the blending component is configured to rotate around a rotational axis and blend the foodstuffs during blending by the blender,
   wherein the base assembly includes an electrical motor configured to drive rotation of the blending component;
   wherein the container assembly is configured to hold the foodstuffs within a container body during blending by the blender;
   wherein the control interface includes a button, wherein the button of the control interface is configured to be pushed by the user, wherein the control interface is configured to:
   (i) control operation of the blender using at least two blending modes of operation of the blender, wherein the at least two blending modes of operation include a fixed-time blending mode of operation and a variable-time blending mode of operation, and
   (ii) control transitions between the different blending modes of operation and a ready-to-blend mode, wherein during the ready-to-blend mode the blender is not blending;
   wherein the control circuitry is configured to:
   control the electrical motor during the rotation of the blending component;
   make detections regarding the button of the control interface being pushed by the user, wherein the detections include a first type of detections and a second type of detections, wherein the first type of detections indicate occurrences of the user single-pushing the button of the control interface, and wherein the second type of detections indicate occurrences of the user double-pushing the button of the control interface;
   effectuate the transitions between the different blending modes of operation based on the detections, wherein the transitions include:
   (i) a first transition from the ready-to-blend mode to the fixed-time blending mode of operation, wherein the first transition occurs responsive to an occurrence of the first type of detections, wherein, during the fixed-time blending mode of operation, the control circuitry is configured to effectuate the rotation of the blending component for a particular duration, wherein the particular duration is limited to a predetermined time limit,
   (ii) a second transition from the ready-to-blend mode to the variable-time blending mode of operation, wherein the second transition occurs responsive to an occurrence of the second type of detections, wherein, during the variable-time blending mode of operation, the control circuitry is configured to effectuate the rotation of the blending component for one or more durations, wherein individual ones of the one or more durations correspond to individual occurrences of the button of the control interface being pushed down by the user, and
   (iii) a third transition from the variable-time blending mode of operation to the ready-to-blend mode, wherein the third transition occurs automatically responsive to a detection of an idle duration during which the button of the control interface is not being pushed by the user.

2. The blender of claim 1, wherein the button of the control interface is the only user-manipulatable portion of the control interface, such that no other button or user interface component controls the operation of the blender or the transitions between the different blending modes of operation used by the blender.

3. The blender of claim 1, wherein the control interface further includes one or more controllable light-emitting components configured to selectively light up, and wherein the control circuitry is further configured to control the one or more light-emitting components to indicate, to the user, one or both of the different blending modes of operation and one or more of the transitions between the different blending modes of operation.

4. The blender of claim 1, wherein the blender is portable and rechargeable, wherein the base assembly further includes:
   a rechargeable battery configured to power the electrical motor such that, during blending by the blender, no power is supplied to the electrical motor by a power source that is external to the blender; and a standardized charging interface configured to conduct electrical power to the rechargeable battery.

5. The blender of claim 1, wherein the detections further include a third type of detections, wherein the third type of detections indicate occurrences of the user pushing and holding pushed down the button of the control interface for at least a predetermined duration, wherein the predetermined duration is at least 2 seconds.

6. The blender of claim 1, wherein the transitions include a fourth transition from the fixed-time blending mode of operation to the ready-to-blend mode, wherein the fourth transition occurs responsive to an individual occurrence of the button of the control interface being pushed by the user prior to completion of the particular duration of the rotation of the blending component.

7. The blender of claim 6, wherein the transitions include a fifth transition from the fixed-time blending mode of operation to the ready-to-blend mode of operation, wherein the fifth transition occurs responsive to the completion of the particular duration of the rotation of the blending component.

8. The blender of claim 1, wherein the predetermined time limit during the fixed-time blending mode of operation is between 10 seconds and 60 seconds.

9. The blender of claim 1, wherein the fixed-time blending mode of operation, the variable-time blending mode of operation, and the ready-to-blend mode of operation are mutually exclusive.

10. The blender of claim 1, wherein the container assembly is configured to hold a volume between 8 and 48 ounces of the foodstuffs.

11. A method for transitioning between different blending modes of operation of a blender and a ready-to-blend mode, the blender being configured to blend foodstuffs, wherein during the ready-to-blend mode the blender is not blending, the method comprising:
   making detections regarding a button of a control interface of the blender being pushed by a user, wherein the detections include a first type of detections and a second type of detections, wherein the first type of detections indicate occurrences of the user single-pushing the button of the control interface, and wherein the second type of detections indicate occurrences of the user double-pushing the button of the control interface; and
   effectuating the transitions between the different blending modes of operation based on the detections, wherein the transitions include:
   (i) a first transition from the ready-to-blend mode to the fixed-time blending mode of operation, wherein the first transition occurs responsive to an occurrence of the first type of detections, wherein, during the fixed-time blending mode of operation, the control circuitry is configured to effectuate the rotation of the blending component for a particular duration, wherein the particular duration is limited to a predetermined time limit,
   (ii) a second transition from the ready-to-blend mode to the variable-time blending mode of operation, wherein the second transition occurs responsive to an occurrence of the second type of detections, wherein, during the variable-time blending mode of operation, the control circuitry is configured to effectuate the rotation of the blending component for one or more durations, wherein individual ones of the one or more durations correspond to individual occurrences of the button of the control interface being pushed down by the user, and
   (iii) a third transition from the variable-time blending mode of operation to the ready-to-blend mode, wherein the third transition occurs automatically responsive to a detection of an idle duration during which the button of the control interface is not being pushed by the user.

12. The method of claim 11, wherein the button of the control interface is the only user-manipulatable portion of the control interface, such that no other button or user interface component controls the operation of the blender or the transitions between the different blending modes of operation used by the blender.

13. The method of claim 11, wherein the detections further include a third type of detections, wherein the third type of detections indicate occurrences of the user pushing and holding pushed down the button of the control interface for at least a predetermined duration, wherein the predetermined duration is at least 2 seconds.

14. The method of claim 11, wherein the transitions include a fourth transition from the fixed-time blending mode of operation to the ready-to-blend mode, wherein the fourth transition occurs responsive to an individual occurrence of the button of the control interface being pushed by the user prior to completion of the particular duration of the rotation of the blending component.

15. The method of claim 14, wherein the transitions include a fifth transition from the fixed-time blending mode of operation to the ready-to-blend mode of operation, wherein the fifth transition occurs responsive to the completion of the particular duration of the rotation of the blending component.

16. The method of claim 11, wherein the predetermined time limit during the fixed-time blending mode of operation is between 10 seconds and 60 seconds.

17. The method of claim 11, wherein the fixed-time blending mode of operation, the variable-time blending mode of operation, and the ready-to-blend mode of operation are mutually exclusive.

18. The method of claim 11, wherein the blender holds a volume between 8 and 48 ounces of the foodstuffs.

\* \* \* \* \*